(12) United States Patent
Wiraseranee et al.

(10) Patent No.: US 11,279,987 B2
(45) Date of Patent: Mar. 22, 2022

(54) SEPARATION METHOD OF RARE EARTH ELEMENT AND IRON AND RARE EARTH ELEMENT-CONTAINING SLAG

(71) Applicant: MITSUBISHI MATERIALS CORPORATION, Tokyo (JP)

(72) Inventors: Chompunoot Wiraseranee, Iwaki (JP); Rinat Mirvaliev, Iwaki (JP); Satoshi Okada, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 859 days.

(21) Appl. No.: 16/068,690

(22) PCT Filed: Jan. 4, 2017

(86) PCT No.: PCT/JP2017/000026
§ 371 (c)(1),
(2) Date: Jul. 9, 2018

(87) PCT Pub. No.: WO2017/122556
PCT Pub. Date: Jul. 20, 2017

(65) Prior Publication Data
US 2019/0017147 A1    Jan. 17, 2019

(30) Foreign Application Priority Data

Jan. 12, 2016   (JP) .............................. JP2016-003936

(51) Int. Cl.
C22B 59/00    (2006.01)
C22B 3/44     (2006.01)
(Continued)

(52) U.S. Cl.
CPC ............... *C22B 59/00* (2013.01); *C22B 3/44* (2013.01); *C22B 7/007* (2013.01); *C22B 7/04* (2013.01); *C21C 7/076* (2013.01); *Y02P 10/20* (2015.11)

(58) Field of Classification Search
CPC ......... Y02P 10/20; C21C 7/076; C22B 59/00; C22B 7/04
(Continued)

(56) References Cited

U.S. PATENT DOCUMENTS 3,268,350 A * 8/1966 Grebe .................. C03C 11/007
106/601
4,189,318 A * 2/1980 Zorev .................... B22D 13/00
75/305

(Continued)

FOREIGN PATENT DOCUMENTS

CN    101362192 A    2/2009
CN    105177324 A    12/2015
(Continued)

OTHER PUBLICATIONS

CN101362192A English language translation (Year: 2009).*
(Continued)

*Primary Examiner* — Anthony J Zimmer
*Assistant Examiner* — Sean P. O'Keefe
(74) *Attorney, Agent, or Firm* — Locke Lord LLP; James E. Armstrong, IV; Nicholas J. DiCeglie, Jr.

(57) ABSTRACT

The present invention provides a separation method of a rare earth element and iron including: forming alkali silicate slag incorporating a rare earth element, by melting a rare earth-iron-containing material together with an alkali silicate flux in a metallic silicon melt or an iron-silicon alloy melt; and separating rare earth-containing slag from an iron-silicon alloy, in which volatilization of alkaline components con-
(Continued)

tained in the flux is suppressed by performing heating and melting under an oxidizing atmosphere, and the rare earth-containing slag having a $SiO_2/Na_2O$ molar ratio of 2.1 or less is formed.

5 Claims, 2 Drawing Sheets

(51) Int. Cl.
    *C22B 7/04*     (2006.01)
    *C21C 7/076*     (2006.01)
    *C22B 7/00*     (2006.01)

(58) Field of Classification Search
    USPC .......................................................... 75/419
    See application file for complete search history.

(56) References Cited

U.S. PATENT DOCUMENTS

| | | | | |
|---|---|---|---|---|
| 4,880,463 | A | * | 11/1989 | Saad ..................... B22D 11/111 |
| | | | | 75/305 |
| 2013/0333518 | A1 | * | 12/2013 | Wakoh .................. C21C 7/0645 |
| | | | | 75/329 |
| 2015/0086449 | A1 | * | 3/2015 | Sugita ....................... C22B 3/20 |
| | | | | 423/21.1 |

FOREIGN PATENT DOCUMENTS

| | | | |
|---|---|---|---|
| JP | 02022426 | A * | 1/1990 |
| JP | 2004-068082 | A | 3/2004 |
| JP | 5273241 | B2 | 8/2013 |
| JP | 2013-204095 | A | 10/2013 |
| JP | 5327409 | B2 | 10/2013 |
| JP | 2014-129595 | A | 7/2014 |
| JP | 2014-145099 | A | 8/2014 |
| JP | 2015-148012 | A | 8/2015 |
| JP | 2015-190003 | A | 11/2015 |
| JP | 2015-193931 | A | 11/2015 |
| JP | 2016-108632 | A | 6/2016 |
| SU | 580229 | A1 | 11/1977 |

OTHER PUBLICATIONS

JP-02022426-A English language translation (Year: 1990).*
International Search Report dated Mar. 28, 2017, issued for PCT/JP2017/000026 and English translation thereof.
Ding, Y. et al., "Innovative Methodology for Separating of Rare Earth and Iron from Bayan Obo Complex Ore", ISIJ International, vol. 52, No. 10, 2012, pp. 1772-1777, XP002792115. (cited in the Jun. 27, 2019 Search Report issued for EP17738311.4).
Y. Yang et al., "Metal Recovery From Industrial Solid Waste—Contribution to Resouice Sustainability", REWAS 2013, TMS 2013 Annual Meeting &Exhibition, San Antonio, Texas, USA, Mar. 3-7, 2013, Springer, Cham, CH, Mar. 3, 2013, pp. 377-389. (cited in the Jun. 27, 2019 Search Report issued for EP17738311.4).
Supplementary European Search Report dated Jun. 27, 2019, issued for the European patent application No. 17738311.4.
"Sintering Pellet Production Technical Manual", edited by Jiang Tao, Beijing: Metallurgical Industry Press, Jun. 30, 2014, pp. 809-810 and cover sheets, (cited in the Office Action issued for CN201780005229.6).
"Handbook of Inorganic Fine Chemicals", edited by Tianjin Chemical Research and Design Institute, Beijing: Chemical Industry Press, Jan. 31, 2001, p. 621 and cover sheets, (cited in the Office Action issued for CN201780005229.6).
"China Metallurgical Encyclopedia Metallurgical Construction (I)", edited by the editor committee for the "Metallurgical Construction" volume of China Metallurgy Encyclopedia General Editor Committee, and the editor department for the "China Metallurgical Encyclopedia" of Metallurgical Industry Press, Beijing: Metallurgical Industry Press, Oct. 31, 1998, p. 870 and cover sheets. (cited in the Office Action issued for CN201780005229.6).
Office Action dated Sep. 18, 2019, issued for Chinese patent application No. 201780005229.6 and English translation thereof.

* cited by examiner

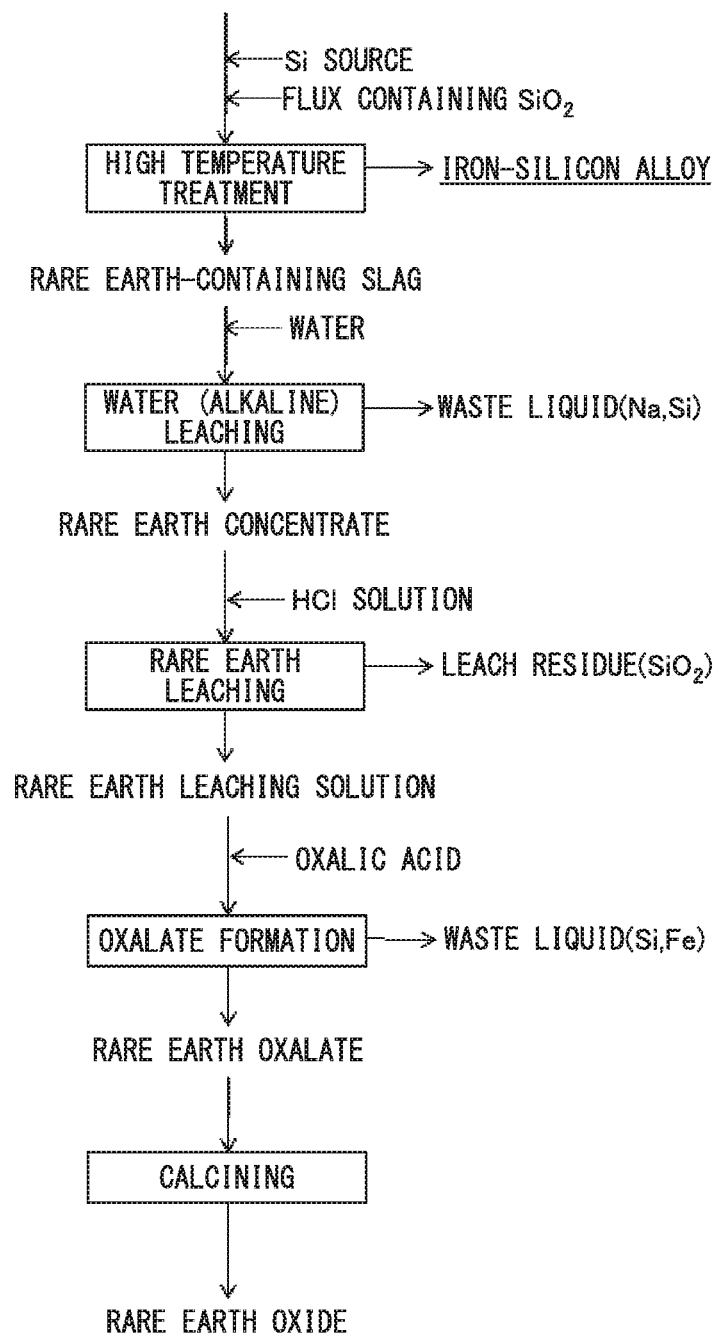

SEPARATION METHOD OF RARE EARTH ELEMENT AND IRON AND RARE EARTH ELEMENT-CONTAINING SLAG

TECHNICAL FIELD

The present invention relates to a method for efficiently separating and recovering a rare earth element and iron from a material, which includes a rare earth element and iron, such as a rare earth magnet, and rare earth element-containing slag.

Priority is claimed on Japanese Patent Application No. 2016-003936, filed on Jan. 12, 2016, the content of which is incorporated herein by reference.

BACKGROUND ART

The rare earth elements are widely used as components of the permanent magnet of motors for hybrid or electric vehicles, home appliances such as washing machines, air conditioners, and refrigerators, hard disks, speakers, and the like. Along with the development of energy-saving technology or requests for CO2 emission reduction, the production of rare earth magnets increases. On the other hand, since the rare earth producers are unevenly distributed, there is a risk that it becomes difficult to stably supply rare earth resources. Therefore, it is required to recover rare earth elements from rare earth element-containing scrap and thereby recycle the rare earth element.

In the rare earth-containing scrap, since a large amount of iron is present together with the rare earth elements in general, it is necessary to efficiently separate coexisting iron in order to recover the rare earth elements. In the related art of recovering rare earth elements, the following methods have been known.

Patent Document 1 discloses a method in which a raw material mixture containing rare earth elements and a transition metal containing Fe is heated to 1350° C. to 1700° C. under an inert atmosphere in a graphite crucible to melt the mixture, and is separated into an rare earth oxide phase (such as Nd—Dy—Pr oxide) as a main component and a metal phase (such as Fe—C alloy) containing the transition metal to recover these.

Patent Document 2 discloses a recovery method in which an object to be treated containing a rare earth element and iron is heated to 1150° C. or higher (for example, 1450° C.) under the presence of carbon after oxidation or without oxidation to separate into a rare earth element oxide phase (such as Nd—Dy—Pr oxide) and an iron alloy phase (such as Fe—C alloy).

Patent Document 3 discloses a method in which an object to be treated containing a rare earth element and an iron family element is subjected to oxidation, is mixed with petroleum coke serving as a carbon supply source, and is heat-treated in an inert gas atmosphere or in a vacuum to separate the rare earth element from the iron family element, as an oxide.

In the methods disclosed in Patent Documents 1 to 3, since the iron is separated as a pure iron or an iron alloy, it is necessary to keep the melt in the furnace under the reducing atmosphere, and the carbon sources such as carbon black and the petroleum coke are added. Therefore, it is difficult to control the atmosphere inside the furnace and equipment costs increase. In addition, since carbon sources are used, CO or CO2 gas is generated. Therefore, there is also an environmental problem.

In addition, the following methods in which rare earth elements are separated by using boron have also been known.

Patent Document 4 discloses a recovery method for rare earth metal in which a boron oxide and a rare earth-iron alloy are dissolved in a crucible and then perform solidifying, whereby the rare earth alloy and the boron oxide are reacted to extract only the rare earth metal into boron oxide.

Patent Document 5 discloses a recovery method in which an object to be treated containing a rare earth element and iron is oxidized and further heated under the presence of boron nitride to separate into a rare earth element oxide phase (such as Nd—Dy—Pr oxide) and an iron-based molten phase (such as Fe-M phase, M is B, Cu, or Ni).

Patent Document 6 discloses a method in which a rare earth element-containing material is heated and melted under the presence of boron oxide to form a boron oxide phase and a rare earth element enriched phase, and the rare earth element enriched phase is separated and recovered.

Patent Document 7 discloses a method in which a rare earth element oxide containing boron is heat-treated together with a carbonate of an alkali metal or an oxide of an alkali metal to absorb boron in a carbonate flux or the like.

Patent Document 8 discloses a method in which an object to be treated containing a rare earth element, iron family element, and boron is oxidized and then is heat-treated at 1550° C. to 1800° C. under the presence of carbon, thereby increasing the rare earth element content but also reducing the amounts of iron and boron.

In the methods disclosed in Patent Documents 4 to 6, boron sources such as a boron oxide or a boron nitride are added and rare earth oxide-boron oxide based slag and an iron-boron alloy are recovered. However, in the method using boron, since the boron is to be removed from a recovered rare earth-containing material, a treatment step for removing boron becomes necessary as in Patent Documents 7 and 8. In addition, when rare earth and boron-containing material is treated by the hydrometallurgical method, it is difficult to remove boron from the wastewater and there is a problem that the cost for a wastewater treatment increases.

As a separation and recovery method of a rare earth element of the related art which solves the problem of the treatment method, Patent Document 9 proposes a method in which a Fe-rich Fe—Si alloy and an alkali metal oxide-silica based flux are added to a raw material containing a rare earth element and iron, these are heated and melted in an inert atmosphere or a reducing atmosphere to transfer the rare earth element to slag and transfer the iron to a Fe—Si molten alloy, thereby being separated.

In the separation method disclosed in Patent Document 9, under the melting temperature, the slag is stable and a specific gravity between a slag phase containing the rare earth element and an iron-silica alloy phase is large, and thus the slag phase and the alloy phase are naturally separated. As described above, the separation method disclosed in Patent Document 9 has an advantage that the rare earth element and iron can be efficiently separated and recovered. On the other hand, since alkaline components in the flux volatilize to reduce an alkali content in the slag, it is difficult to recover rare earth element from the separated slag by leaching with water. In addition, since the treatment is performed under the inert atmosphere, equipment costs increase.

CITATION LIST

Patent Literature

[Patent Document 1] Japanese Patent No. 5273241
[Patent Document 2] Japanese Patent No. 5327409

[Patent Document 3] Japanese Unexamined Patent Application, First Publication No. 2015-193931
[Patent Document 4] Japanese Unexamined Patent Application, First Publication No. 2004-68082
[Patent Document 5] Japanese Unexamined Patent Application, First Publication No. 2013-204095
[Patent Document 6] Japanese Unexamined Patent Application, First Publication No. 2015-148012
[Patent Document 7] Japanese Unexamined Patent Application, First Publication No. 2014-129595
[Patent Document 8] Japanese Unexamined Patent Application, First Publication No. 2014-145099
[Patent Document 9] Japanese Unexamined Patent Application, First Publication No. 2015-190003

SUMMARY OF INVENTION

Technical Problem

An object of the present invention is to provide a separation and recovery method of forming slag incorporating a rare earth element by using an alkali silicate flux, in which an iron-silicon alloy and rare earth-containing slag are formed while preventing the alkaline components in the flux from volatilizing, whereby the separated slag can be leached with water and the rare earth element can be recovered from the leached residue, while maintaining the advantages of the separation method described in Patent Document 9, and rare earth-containing slag obtained by the method.

Solution to Problem

An aspect of the present invention relates to a separation method of a rare earth element and iron, the method having the following configuration, and rare earth-containing slag (hereinafter, respectively referred to as "separation method of a rare earth element and iron of the present invention" and "rare earth-containing slag of the present invention", and the "separation method of a rare earth element and iron of the present invention" is also referred to as a "treatment method of the present invention").

[1] A separation method of a rare earth element and iron, including: forming alkali silicate slag (referred to as rare earth-containing slag) incorporating a rare earth element, by melting a treatment object containing a rare earth element and iron (referred to as a rare earth-iron-containing material) together with an alkali silicate flux in a metallic silicon melt or an iron-silicon alloy melt; and separating the rare earth-containing slag from an iron-silicon alloy, in which volatilization of alkaline components contained in the flux is suppressed, by performing heating and melting under an oxidizing atmosphere, to form the rare earth-containing slag having a $SiO_2/Na_2O$ molar ratio of 2.1 or less.

[2] The separation method of a rare earth element and iron according to [1], in which the rare earth-containing slag is formed by suppressing the volatilization rate of the alkaline components from the alkali silicate flux to be 25.5% or lower.

[3] The separation method of a rare earth element and iron according to [1] or [2], in which the rare earth-containing slag, in which the $SiO_2/Na_2O$ molar ratio is 2.1 or less and a $SiO_2$ content is 50 wt % or less, is formed by suppressing the volatilization rate of Na to be 25.5% or lower, by using sodium silicate as the alkali silicate flux.

[4] The separation method of a rare earth element and iron according to any one of [1] to [3], in which the rare earth-iron-containing material is melted inside a ceramic container by heating the rare earth-iron-containing material in the air or by heating the rare earth-iron-containing material in an inert atmosphere by blowing air onto a surface of a melt.

[5] The separation method of a rare earth element and iron according to any one of [1] to [4], further including: leaching an alkali silicate from the slag separated from the iron-silicon alloy, with water; and recovering the rare earth element from a rare earth element concentrate of a leached residue.

[6] The separation method of a rare earth element and iron according to any one of [1] to [5], further including: leaching the alkaline silicate separated from the iron-silicon alloy, with water; recovering a leached residue to perform leaching with hydrochloric acid; forming an oxalate by adding oxalic acid to leachate; and recovering and calcining the oxalate to recover a rare earth oxide.

[7] Rare earth element-containing slag which is a melted product of a rare earth-iron-containing material and an alkali silicate flux, in which a $SiO_2/Na_2O$ molar ratio is 2.1 or less and a $SiO_2$ content is 50 wt % or less.

Advantageous Effects of Invention

In the treatment method of the present invention, since the rare earth-iron-containing material is melted by heating in an oxidizing atmosphere together with the alkali silicate flux, it is possible to perform a treatment in the air and it is not necessary to control an atmosphere inside a furnace. In addition, since a general furnace (a ceramic type refractory furnace) can be used, the equipment costs can be greatly reduced. In addition, since the amount of volatile substances is less, costs for an exhaust gas treatment and the like can also be reduced.

In the treatment method of the present invention, since volatilization of the alkaline components contained in the flux is suppressed and the rare earth-containing slag having the $SiO_2/Na_2O$ molar ratio of 2.1 or less is formed, the slag can be leached as it is with water and the rare earth element concentrate can be recovered. Therefore, a leaching treatment is easy, and the burden of waste liquid treatment is small.

In the treatment method of the present invention, the separation efficiency between the rare earth element and iron and the recovery rate are high, and the amount of volatile substances is less. In addition, a rare earth oxide and the like recovered at the end has a high purity of the rare earth element. In addition, since a toxic material such as boron is not used, wastewater treatment is easy and an influence on the environment is small.

BRIEF DESCRIPTION OF DRAWINGS

FIG. 2 is a process chart of treatments from heating and melting the rare earth-iron-containing material to recovering a rare earth oxide.

DESCRIPTION OF EMBODIMENTS

Figure 1:
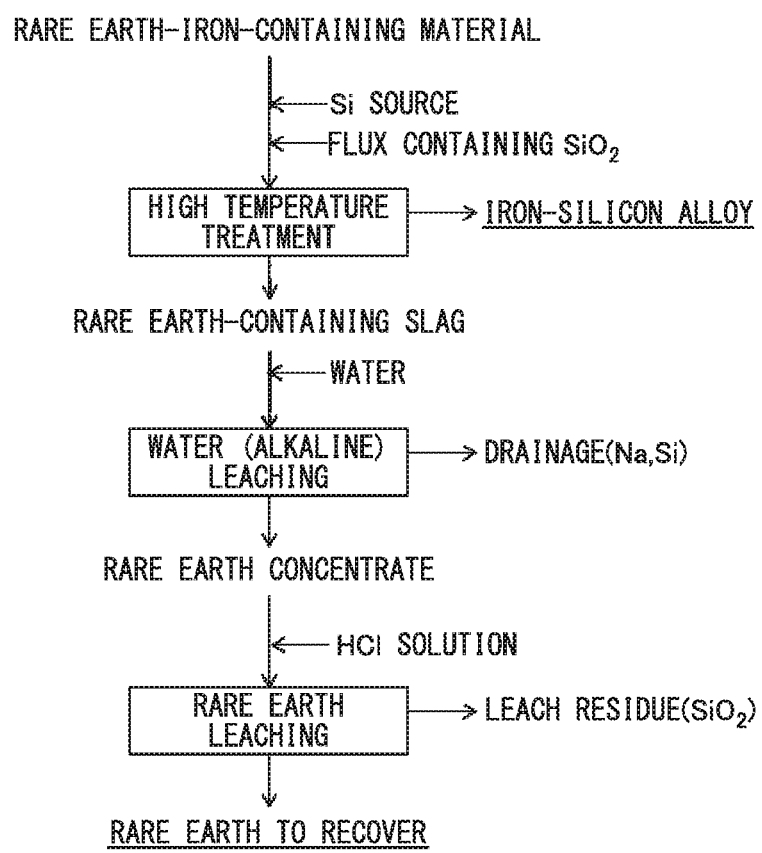
FIG. 1 is a process chart of a treatment of separating and leaching rare earth from a rare earth-iron-containing material.

A treatment method of the present invention includes: forming alkali silicate slag (referred to as rare earth-containing slag) incorporating a rare earth element, by melting a rare earth-iron-containing material together with a flux of an alkali silicate in a metallic silicon melt or an iron-silicon alloy melt; and separating the rare earth-containing slag from an iron-silicon alloy, in which volatilization of alkaline components contained in the flux is suppressed, by performing heating and melting under an oxidizing atmosphere, to form the rare earth-containing slag having a $SiO_2/Na_2O$ molar ratio of 2.1 or less.

An outline of the treatment method of the present invention is shown in the process chart of FIG. 1.

Weight in the present specification is used synonymously with mass. Accordingly, the weight ratio is the mass ratio and the wt % is mass %.

In the treatment method of the present invention, the rare earth-iron-containing material is melted together with the alkali silicate flux in the metallic silicon melt or the iron-silicon alloy melt, the volatilization of the alkaline components contained in the flux is suppressed, thereby forming and separating the slag incorporating the rare earth element.

Examples of the rare earth-iron-containing material include machining chips (sludge) or scraps of rare earth magnet, scraps of a motor rotor having a rare earth magnet, and the like. A motor having a rare earth magnet is used for electric vehicles, hybrid vehicles, electronic devices, or home appliances. In addition, a material containing the rare earth element is also used for VCMs or speakers of electronic devices. In the separation method of the present invention, these rare earth-iron-containing materials can be used as raw materials.

As the alkali silicate flux, a compound containing oxides of alkali metal and silicon can be used. For example, sodium orthosilicate ($2Na_2O$—$SiO_2$), sodium metasilicate ($Na_2O$—$SiO_2$), sodium disilicate ($Na_2O$-$2SiO_2$), potassium metasilicate ($K_2O$—$SiO_2$), potassium disilicate ($K_2O$-$2SiO_2$), and the like can be used. Further, the alkali silicate flux may contain a small amount of oxide, for example, 5 wt % or less of a calcium oxide, a boron oxide, a chromium oxide, a manganese oxide, an aluminum oxide, and a magnesium oxide. The alkali silicate flux can be reused by recovering a rare earth-containing flux separated after the heating and melting treatment.

The rare earth-iron-containing material and the alkali silicate flux are mixed with metallic silicon or an iron-silicon alloy. The mixture is heated to 1250° C. to 1550° C. under the oxidizing atmosphere, by using a ceramic container, to form a metallic silicon melt or an iron-silicon alloy melt. The rare earth-iron-containing material is melted in the melt. Alternatively, the rare earth-iron-containing material and the alkali silicate flux are added to the metallic silicon melt or the iron-silicon alloy melt inside the ceramic container and heated to 1250° C. to 1550° C. under the oxidizing atmosphere to melt the rare earth-iron-containing material in the melt.

When the rare earth-iron-containing material is heated and melted together with the flux, in the metallic silicon melt or the iron-silicon alloy melt, the iron in the rare earth-iron-containing material tends to react with silicon rather than becoming an iron oxide, in a coexisting system with the flux. Therefore, the iron of the rare earth-containing material reacts with silicon in the melt to form an iron-silicon alloy. The generated iron-silicon alloy melt is accumulated at the bottom of the container, and the amount of the iron-silicon alloy melt increases gradually, along with the progress of the melting reaction.

Since the metallic silicon melt reacts with the iron of the rare earth-iron-containing material to become an iron-silicon alloy melt, the iron-silicon alloy may be used from the beginning. The iron-silicon alloy can be reused by recovering the iron-silicon alloy separated after the melting treatment. Since when the iron concentration in the iron-silicon alloy is close to 90 wt %, a capacity for receiving iron in the rare earth-iron-containing material becomes low, the iron-silicon alloy having the iron concentration lower than 90 wt %, for example, 75 wt %, may preferably be used.

In the iron-silicon alloy melt, when an iron content is within the range of 40 wt % to 50 wt %, a melting temperature thereof is approximately 1250° C., and when the iron content is within the range of 60 wt % to 70 wt %, the melting temperature thereof becomes approximately 1300° C. or higher. When the iron content is in around 80 wt %, the melting temperature falls again to approximately 1250° C., thereafter, the melting temperature increases to approximately 1550° C., along with the iron content. Accordingly, in order to obtain an iron-silicon alloy melt, according to a component ratio between iron and silicon, heating may be performed to 1250° C. to 1550° C. to form a melt. A heating time may be a time during which a melt is formed.

The alkali silicate flux becomes a slag incorporating the rare earth element, by the heating and melting treatment. The rare earth element in the rare earth-iron-containing material is different from the iron in the rare earth-iron-containing material, and is oxidized by heating the rare earth-iron-containing material under an oxidizing atmosphere to be incorporated into the slag. For example, a sodium silicate flux becomes a slag containing a rare earth oxide, together with a sodium oxide and silica.

In the treatment method of the present invention, volatilization of the alkaline components contained in the flux is suppressed by performing heating and melting under the oxidizing atmosphere, and the rare earth-containing slag having the $SiO_2/Na_2O$ molar ratio of 2.1 or less is formed. In general, in the heating and melting treatment, since the alkaline components of the flux volatilize to be reduced and the silicon in the melt is slightly oxidized to be incorporated into the slag, the silicon concentration in the slag increases. Therefore, the $SiO_2/Na_2O$ molar ratio in the slag tends to be larger than that of flux at the beginning. In the treatment method of the present invention, the volatilization of the alkaline components is suppressed by heating and melting the slag under the oxidizing atmosphere. Specifically, the volatilization rate of the alkaline components from the flux is suppressed to 25.5% or lower, preferably 10% or lower, thereby forming rare earth-containing slag having the $SiO_2/Na_2O$ molar ratio of 2.1 or less, preferably having a $SiO_2/Na_2O$ molar ratio of 2.1 or less and a $SiO_2$ content of 50 wt % or lower.

For example, in a case where the sodium metasilicate ($SiO_2/Na_2O$ molar ratio of 1.0) is used as the alkali silicate flux, when the volatilization rate of Na from the flux is suppressed to 10% or lower, the rare earth-containing slag having a $SiO_2/Na_2O$ molar ratio of 1.07 to 1.17 (Examples 1 and 2) can be formed. In addition, in a case where the sodium disilicate ($SiO_2/Na_2O$ molar ratio of 2; measured value of 1.919), when the volatilization rate of Na from the flux is suppressed to 10% or lower, the rare earth-containing slag having a $SiO_2/Na_2O$ molar ratio of 1.924 (Example 3) can be formed.

On the other hand, when the heating and melting treatment is performed in a non-oxidizing atmosphere such as an inert gas, since the alkaline components contained in the flux are reduced, the volatilization of the alkaline components increases. When the heating and melting is performed using a carbon container, since reduction of the alkaline components proceeds due to a reaction with carbon, the amount of volatilization of the alkaline components further increase, and the $SiO_2/Na_2O$ molar ratio in the slag greatly increases.

In the treatment method of the present invention, the heating under the oxidizing atmosphere may preferably be performed in the air or performed in an inert atmosphere by blowing air onto a surface of a melt. As the melting container, a ceramic crucible of magnesia type or alumina type, or a graphite type crucible of C—$SiO_2$—SiC type is preferably be used.

According to the heating and melting treatment, the iron-silicon alloy melt is accumulated at the bottom of the container and the rare earth-containing slag is formed on the melt. Since the slag is in a molten state, the slag can be easily extracted from the container. The iron-silicon alloy melt contains little rare earth element and almost the whole amount of rare earth element is incorporated in the slag. Accordingly, the slag is separated from the iron-silicon alloy melt, whereby almost the whole amount of rare earth element and the iron contained in the rare earth-iron-containing material can be separated from each other.

In the treatment method of the present invention, the rare earth-containing slag having the $SiO_2/Na_2O$ molar ratio of 2.1 or less is formed. In general, in the slag having the $SiO_2/Na_2O$ molar ratio of more than 2.1, since the $SiO_2$ content is large and $Na_2O$ content is small, it is difficult to leach the alkali silicate contained in the slag, with water. Therefore, in order to separate the silica component and the rare earth element in the slag, it is necessary to perform alkali leaching or acid leaching for a long time and wet process takes time and effort.

On the other hand, in the treatment method of the present invention, since the slag having the $SiO_2/Na_2O$ molar ratio of 2.1 or less is formed, water soluble alkali silicate can be easily leached from the slag, with water. As a result, the rare earth elements concentrated in the leached residue can be efficiently separated and recovered. In the rare earth-containing slag having the $SiO_2/Na_2O$ molar ratio of 2.1 or less and $SiO_2$ content of 50 wt % or lower, water leaching becomes easier.

Examples of a method of recovering the rare earth element from the rare earth element concentrate include a method including: adding hydrochloric acid to the rare earth element concentrate; leaching the rare earth element under the liquidity of pH 1 or lower; adding oxalic acid to the rare earth element leachate; forming an oxalate of the rare earth element under the liquidity of pH 1 or lower; recovering the rare earth element oxalate by a solid-liquid separation to perform calcining at 900° C.; and obtaining a rare earth oxide. FIG. 2 shows a process of treatments from heating and melting the rare earth-iron-containing material to recovering a rare earth oxide. As the method of recovering the rare earth from the rare earth element concentrate, a solvent extraction method also is used, whereby the rare earth element may be separated to be recovered each rare earth oxide.

EXAMPLES

Examples of the present invention and Comparative examples will be shown together. In Examples and Comparative examples, a composition of the iron-silicon alloy was quantitatively analyzed using X-ray fluorescence spectrometry (XRF method) and electron probe micro analysis (EPMA). In addition, the composition of the recovered matter containing the rare earth element was quantitatively analyzed using a chemical method.

The compositions of objects to be treated (I) and (II) used in Examples and Comparative examples were shown in Table 1. Treatment conditions and the recovered amounts of slag and an alloy were shown in Table 2. A composition of the recovered rare earth-containing slag and a $SiO_2/Na_2O$ molar ratio were shown in Table 3. A composition of an iron-silicon alloy was shown in Table 4. Transition rates of rare earth element and iron to slag and Na volatilization rate were shown in Table 5.

The Transition rate of the rare earth element to the slag is a weight ratio [RE(S)/RE(M)×100%] of a rare earth element content RE(S) in the slag to a rare earth element content RE(M) in the object to be treated. The Transition rate of iron is a weight ratio [Fe(S)/Fe(M)×100%] of an iron content Fe(S) in the slag to an iron content Fe(M) in the object to be treated. The Na volatilization rate is a weight ratio [[Na(F)—Na(S)]×100%/Na(F)] of the difference between a Na content [Na(F)] in the flux and a Na content [Na(S)] in the slag to the Na content [Na(F)] in the flux.

Example 1

38.0 g of the object to be treated (I) shown in Table 1 and 4.6 g of metallic silicon (purity of 99%) were put into a magnesia crucible. Further, 48.0 g of flux including sodium metasilicate ($Na_2O$—$SiO_2$) were added thereto. Heating was performed at 1300° C. in the air to form a melt and the melt was held for 60 minutes. Thereafter, a sample was cooled with water, 31.0 g of the iron-silicon alloy and 64.0 g of slag were recovered.

Example 2

20.0 g of the object to be treated (I) and 2.4 g of metallic silicon were put into an alumina crucible. 24.0 g of sodium metasilicate as in Example 1 was added thereto. Heating and melting treatment was performed under the same conditions as in Example 1, except that the heating time was set to 30 minutes, 45 minutes, and 60 minutes. 16.0 g of iron-silicon alloy and respectively 32.0 g, 32.5 g, and 33.0 g of slag were recovered.

Example 3

43.0 g of the object to be treated (I) and 5.0 g of metallic silicon were put into a graphite crucible. 45.0 g of sodium disilicate [$Na_2O$-$2SiO_2$] was added thereto. The heating temperature was set to 1350° C. and the heating time was set to 20 minutes. Melting treatment was performed by blowing air onto the melt while maintaining an argon gas atmosphere. 35.0 g of iron-silicon alloy and 59.0 of slag were recovered.

Example 4

10.0 g of the object to be treated (I) shown in Table 1 and 1.2 g of metallic silicon were put into an alumina crucible. Further, 12.0 g of flux including sodium orthosilicate ($2Na_2O$—$SiO_2$) were added thereto. Heating was performed at 1300° C. in the air to form a melt and the melt was held for 5 minutes. Thereafter, a sample was cooled with water, 7.5 g of the iron-silicon alloy and 15.0 g of slag were recovered.

As shown in Tables 2 to 5, in all the slags of Examples 1 to 3, the Transition rate of the rare earth element to the slag was 100%. On the other hand, the Transition rate of the iron to the slag was 1.2% or lower, and the separability between the rare earth element and the iron was good. In addition, in all the slags of Examples 1 to 3, the Na volatilization rate was 10% or lower and volatilization of Na was suppressed, and the slag having a $SiO_2/Na_2O$ molar ratio of 2.1 or less was formed.

In addition, as shown in Table 5, the Transition rate of the rare earth element to the slag was 100%. On the other hand, the Transition rate of the iron to the slag was 1.20% or lower, and the separability between the rare earth element and the iron was good. In addition, the Na volatilization rate was 25.5% or lower, and preferably, the Na volatilization rate was 10% or lower (Examples 1 to 3), and the Na volatilization rate is greatly suppressed as compared with Comparative Example 2. In Example 4, the Na volatilization rate was high, that is, 25.4%; however, since the $SiO_2/Na_2O$ molar ratio was 2.1 or less and $SiO_2$ content was 50 wt % or lower, water leaching became easier. Accordingly, in all the rare earth-containing slags of Examples 1 to 4, the alkali silicate in the slag can be leached with water and the rare earth elements concentrated in the leached residue can be efficiently separated and recovered.

Comparative Example 1

43.4 g of the object to be treated (I) and 5.0 g of metallic silicon were put into a graphite crucible. 45.0 g of sodium disilicate [$Na_2O$ (35 wt %)-$SiO_2$ (65 wt %)] was added thereto. The heating temperature was set to 1350° C. and the heating time was set to 20 minutes. A heating and melting treatment was performed under the same conditions as in Example 1, except for an argon gas atmosphere. 35.0 g of iron-silicon alloy and 58.0 g of slag were recovered.

Comparative Example 2

2.4 g of the object to be treated (II) and 9.6 g of iron silicon (Si 25 wt %) were put into a carbon crucible. 6.0 g of sodium metasilicate [$Na_2O$ (50 wt %)-$SiO_2$ (50 wt %)] was added thereto. The heating temperature was set to 1300° C. and the heating time was set to 5 hours. A heating and melting treatment was performed under the same conditions as in Example 1, except for an argon gas atmosphere. 11.2 g of iron-silicon alloy and 7.2 g of slag were recovered.

Comparative Example 3

10 g of the slag recovered in Comparative Example 1 was taken, and 0.1 L of 4 g/L concentration caustic soda solution was added thereto. Heating was performed at 50° C. for 3 hours to attempt leaching of the water-soluble silica and Na content. As a result, decomposition of the slag was not confirmed. Next, as a result of performing autoclave leaching under the conditions of caustic soda concentration of 4 g/L at 150° C. for 6 hours, a $SiO_2$ leaching rate was 60% and decomposition of the slag was insufficient.

As shown in Tables 2 to 5, since the slags of Comparative Examples 1 and 2 was heat-treated under the argon gas atmosphere, the Na volatilization rate was 23.1% to 40.9%, which is greatly higher than the Na volatilization rate of Examples 1 to 3. Therefore, the Na concentration in the slag was lowered and the $SiO_2/Na_2O$ molar ratio of the slag was 2.1 or more. In addition, as shown in Comparative Example 3, the slag having the $SiO_2/Na_2O$ molar ratio of 2.1 or more was low in water solubility, and the alkali silicate was difficult to be leached with water.

TABLE 1

| Composition of object to be treated | | | | | |
|---|---|---|---|---|---|
| | Fe (wt %) | Nd (wt %) | Dy (wt %) | Pr (wt %) | B (wt %) |
| Object to be treated (I) | 67 | 18 | 7 | 5 | 1 |
| Object to be treated (II) | 68 | 20 | 10 | — | 1 |

TABLE 2

Treatment conditions and recovered amounts of slag and alloy

| | Example 1 | Example 2 | Example 3 |
|---|---|---|---|
| Kinds of treatment object | Object to be treated (I) | Object to be treated (I) | Object to be treated (I) |
| Treated amount | 38.0 g | 20.0 g | 43.0 g |
| Silicon source | Metallic silicon 4.6 g | Metallic silicon 2.4 g | Metallic silicon 5.0 g |
| Flux | Sodium metasilicate 48.0 g | Sodium metasilicate 24.0 g | Sodium disilicate 45.0 g |
| $SiO_2/Na_2O$ molar ratio of flux | 1.0 | 1.0 | 2.0 |
| Container (crucible) material | Magnesia (MgO based) | Alumina ($Al_2O_3$ based) | Graphite (C—$SiO_2$—SiC) |
| Treatment Temperature | 1300° C. | 1300° C. | 1350° C. |
| Heating atmosphere | The air | The air | Argon Blowing air onto melt |
| Time for high temperature treatment | 60 min | 30 min | 45 min | 60 min | 20 min |
| Iron-silicon alloy recovered amount | 31.0 g | 16.0 | 16.0 g | 16.0 g | 35.0 g |
| Rare earth-containing slag recovered amount | 64.0 g | 32.0 g | 32.5 g | 33.0 g | 59.0 g |

| | Example 4 | Comparative Example 1 | Comparative Example 2 |
|---|---|---|---|
| Kinds of treatment object | Object to be treated (I) | Object to be treated (I) | Object to be treated (II) |
| Treated amount | 10.0 g | 43.4 g | 2.4 g |
| Silicon source | Metallic silicon | Metallic silicon | Iron-silicon alloy |

TABLE 2-continued

Treatment conditions and recovered amounts of slag and alloy

| Flux | 1.2 g<br>Sodium orthosilicate<br>12.0 g | 5.0 g<br>Sodium disilicate<br>45.0 g | (Si 25%) 9.6 g<br>Sodium metasilicate<br>6.0 g |
|---|---|---|---|
| $SiO_2/Na_2O$ molar ratio of flux | 0.5 | 2.0 | 1.0 |
| Container (crucible) material | Alumina ($Al_2O_3$ based) | Graphite ($C-SiO_2-SiC$) | Graphite (Carbon) |
| Treatment Temperature | 1300° C. | 1350° C. | 1300° C. |
| Heating atmosphere | The air | Argon | Argon |
| Time for high temperature treatment | 5 min | 20 min | 5 hr |
| Iron-silicon alloy recovered amount | 7.5 g | 35.0 g | 11.2 g |
| Rare earth-containing slag recovered amount | 15.0 g | 58.0 g | 7.2 g |

TABLE 3

Composition of rare earth-containing slag

| | $Na_2O$ wt % | $SiO_2$ wt % | $SiO_2/Na_2O$ molar ratio | $Nd_2O_3$ wt % | $Dy_2O_3$ wt % | $Pr_2O_3$ wt % | MgO wt % | $Al_2O_3$ wt % | FeO wt % |
|---|---|---|---|---|---|---|---|---|---|
| Example 1 | 33.8 | 36.3 | 1.11 | 12.4 | 4.8 | 3.5 | 7.8 | — | 0.1 |
| Example 2  30 min | 36.1 | 37.6 | 1.07 | 12.9 | 5.0 | 3.6 | — | 4.7 | 0.1 |
| 45 min | 35.4 | 37.5 | 1.09 | 12.7 | 4.9 | 3.6 | — | 3.6 | 0.5 |
| 60 min | 33.2 | 37.6 | 1.17 | 12.4 | 4.7 | 3.5 | — | 5.8 | 1.4 |
| Example 3 | 26.0 | 48.4 | 1.92 | 15.2 | 5.8 | 2.5 | — | — | 0.3 |
| Example 4 | 40.2 | 33.8 | 0.87 | 14.0 | 5.4 | 3.9 | — | 2.4 | 0.3 |
| Comparative Example 1 | 20.9 | 51.7 | 2.55 | 15.7 | 6.0 | 4.4 | — | — | <0.1 |
| Comparative Example 2 | 28.2 | 58.7 | 2.15 | 9.0 | 4.5 | — | — | — | <0.1 |

TABLE 4

Composition of iron-silicon alloy

| | Fe wt % | Si wt % | Others Wt % |
|---|---|---|---|
| Example 1 | 82.1 | 15.5 | 1.6 |
| Example 2  30 min | 83.9 | 13.9 | 2.2 |
| 45 min | 83.7 | 13.8 | 2.5 |
| 60 min | 83.4 | 12.5 | 4.1 |
| Example 3 | 82.9 | 14.9 | 2.2 |
| Example 4 | 89.9 | 9.1 | 1.0 |
| Comparative Example 1 | 83.0 | 13.1 | 3.9 |
| Comparative Example 2 | 80.3 | 18.7 | 1.0 |

TABLE 5

Transition rate of rare earth element and iron to slag, and Na volatilization rate

| | Transition rate (%) to slag | | Volatilization rate (%) of Na from slag |
|---|---|---|---|
| | Rare earth element | Fe | |
| Example 1 | 100 | 0.25 | 9.7 |
| Example 2  30 min | 100 | 0.25 | 1.6 |
| 45 min | 100 | 0.25 | 3.2 |
| 60 min | 100 | 1.20 | 5.7 |
| Example 3 | 100 | 0.61 | 2.6 |
| Example 4 | 100 | 0.52 | 25.4 |
| Comparative Example 1 | 100 | <0.08 | 23.1 |
| Comparative Example 2 | 100 | <0.08 | 40.9 |

Example 5

0.6 L of water was added to 60 g of the slag recovered in Example 1. Heating was performed at a room temperature to 50° C. for 3 hours. The water-soluble silica and Na content were sufficiently leached. A solution (pH 12) containing Na and Si was subjected to solid-liquid separation and discharged out of the system. 45.4 g or leached residue (dry) was recovered. The leached residue was stirred in hydrochloric acid solution at pH of 0 to 1 at room temperature for 1 hour to leach the rare earth element. The leached residue ($SiO_2$ 99 wt % or more) was subjected to the solid-liquid separation. The leachate containing the rare earth element was recovered. An oxalic acid solution was added to the leachate, and was stirred at pH of 0 to 1, at a room temperature for 1 hour to precipitate the oxalate. A solution containing hydrochloric acid, Si, and Fe was subjected to solid-liquid separation and discharged out of the system. Oxalate was recovered. The oxalate was calcined at 900° C. for 1 hour to recover 12.4 g of the rare earth oxide. The purity of the recovered material was 99% or higher, and the recovery rate was 97% or higher.

INDUSTRIAL APPLICABILITY

In the separation method of the present invention, separability between iron and rare earth element is good, the amount of volatile substances is less, and a treatment can be performed by using a general furnace in the air. Therefore, the separation method of the present invention is suitable for practical use. In addition, since a rare earth oxide recovered at the end has high purity, the rare earth oxide can be easily reused.

The invention claimed is:

1. A separation method of a rare earth element and iron, comprising:
    forming alkali silicate slag (referred to as rare earth-containing slag) incorporating a rare earth element, by melting a treatment object containing a rare earth element and iron (referred to as a rare earth-iron-containing material) together with an alkali silicate flux in a metallic silicon melt or an iron-silicon alloy melt;
    separating the rare earth-containing slag from an iron-silicon alloy;
    leaching an alkali silicate from the slag separated from the iron-silicon alloy, with water; and
    recovering the rare earth element from a rare earth element concentrate of a leached residue,
    wherein volatilization of alkaline components contained in the flux is suppressed, by performing heating and melting under an oxidizing atmosphere, to form the rare earth-containing slag having a $SiO_2/Na_2O$ molar ratio of 2.1 or less.

2. The separation method of a rare earth element and iron according to claim 1,
    wherein the rare earth-containing slag is formed by suppressing a volatilization rate of the alkaline components from the alkali silicate flux to be 25.5% or lower.

3. The separation method of a rare earth element and iron according to claim 2,
    wherein the rare earth-containing slag, in which the $SiO_2/Na_2O$ molar ratio is 2.1 or less and a $SiO_2$ content is 50 wt % or less, is formed by suppressing a volatilization rate of Na to be 25.5% or lower, by using sodium silicate as the alkali silicate flux.

4. The separation method of a rare earth element and iron according to claim 1,
    wherein the rare earth-containing slag, in which the $SiO_2/Na_2O$ molar ratio is 2.1 or less and a $SiO_2$ content is 50 wt % or less, is formed by suppressing a volatilization rate of Na to be 25.5% or lower, by using sodium silicate as the alkali silicate flux.

5. The separation method of a rare earth element and iron according to claim 1, further comprising:
    leaching an alkali silicate from the slag separated from the iron-silicon alloy, with water;
    recovering a leached residue to perform leaching with hydrochloric acid;
    forming an oxalate by adding oxalic acid to leachate; and
    recovering and calcining the oxalate to recover a rare earth oxide.

* * * * *